Dec. 30, 1969 W. O. CHANEY 3,486,224

METHOD OF SECURING AN ELECTRICAL COMPONENT TO A CIRCUIT BOARD

Filed Nov. 17, 1967

INVENTOR/S

WILLARD O. CHANEY,

BY Melville, Strasser, Foster and Hoffman

ATTORNEYS

1

3,486,224

METHOD OF SECURING AN ELECTRICAL COMPONENT TO A CIRCUIT BOARD

Willard O. Chaney, Cincinnati, Ohio, assignor, by mesne assignments, to Standard International Corporation, a corporation of Ohio Filed Nov. 17, 1967, Ser. No. 684,061
Int. Cl. H05k 3/30
U.S. Cl. 29—626 5 Claims

ABSTRACT OF THE DISCLOSURE

A component, such as a coil form, of thermoplastic material, having mounting feet of said material, is temporarily secured to the circuit board by pressing said mounting feet through holes in the circuit board, the coil ends passing through holes in said board in contact with appropriate circuit elements on the reverse side of said board. When said board is subjected to a solder bath to complete the circuit, the coil ends are secured to said circuit elements and concurrently the ends of said mounting feet are fused to form rivet-like heads, permanently securing said component to said board.

BACKGROUND OF THE INVENTION

The field to which this invention relates is the field of electrical components such as transformers and the like, wound on coil forms which are to be attached to circuit board having, for example, a printed circuit on the reverse side. More specifically, it relates to the structure of the component enabling it to be secured to the circuit board during the soldering operation.

Heretofore where a component such as a coil or a transformer was to be secured to a circuit board and the coil was of relatively heavy wire, the coil ends constituted mounting feet. Such coil ends were passed through holes in the mounting board communicating with appropriate elements of the printed circuit and when the board was passed through a solder bath, the coil ends were soldered in place and the soldering operation served to secure the coil to the board.

Where the coil was of relatively fine wire such that the ends of such coil were too flimsy to provide mounting feet, it was the practice to secure to the coil form an appropriate number of so-called transition lugs of metal to serve as mounting lugs and to carry the curent through the board to the circuit elements to which the coil was to be connected. With this construction, it was necessary first to carry out an operation to secure the transition lugs to the coil form, then an operation to solder the coil ends to appropriate ones of the transition lugs and finally when the coil form was mounted on the board, the transition lugs had to be soldered into the electric circuit.

SUMMARY OF THE INVENTION

According to the present invention, if the wire of the coil is so thin that it is not self-sustaining in the sense that the wire could constitute mounting feet for the coil form, the coil form itself is provided with mounting feet which can pass through an appropriate hole or holes in the circuit board and held temporarily in place while the coil ends are passed through other holes appropriately positioned with respect to circuit elements to which the coil is to be connected. When the circuit board is then passed through the solder bath, not only are the coil ends soldered in place in the electric circuit but the ends of the mounting feet are concurrently fused into a rivet-like head whereby the coil form is permanently secured to the circuit board. The coil form and its integral mounting feet are made of a thermoplastic material.

2

DESCRIPTION OF THE PREFERRED EMBODIMENTS

Figure 1:
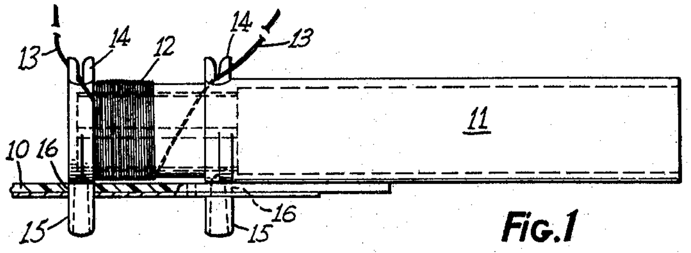
FIG. 1 is an elevational view with parts in section of a typical coil form with a coil thereon temporarily secured to a circuit board.

In the assembly of electrical circuits such as, for example, radio and television receivers, the use of printed circuits has come into prominence. The circuit is printed on a board usually composed of a phenolic resin. A phenolic board as above described is generally copper plated and thereafter a pattern of wax is applied to the board over the copper by silk screening. The wax defines the elements of the printed circuit. When the board is then subjected to an acid treatment, the copper is eaten away except in those areas which are covered by wax. When the wax is then removed, the copper circuitry remains on the board. Sometimes if it is desired that solder be confined to actual connections, a non-stick material is overprinted by silk screening to prevent the solder from sticking where it is not desired.

With the board prepared as above described, all the various components which are to be connected into the circuit are mounted on the board with their connecting wires passing through holes in the board in contact with elements of the printed circuit to which the wires are to be soldered. The board with the various components including such things as coils, condensers, transistors and the like, is run through a bath of liquid solder as a result of which the various wires which pass through the board as soldered to the appropriate elements of the electrical circuit.

The problem to be met by the present invention arises in connection with coils of very thin wire, the wire being so thin that it is not self-sustaining and cannot properly support the coil form on the circuit board. According to the present invention, the coil form, which is of a thermoplastic material, is provided with mounting legs or feet which are adapted to be temporarily mounted on the mounting board with the ends of the coil which is wound on the coil form passing through appropriate holes for soldering. When the mounting board is then passed through the solder bath, the solder not only completes the connections of the several components with the printed circuit, but the heat of the solder bath effectively and concurrently fuses the ends of the mounting feet which project through the board into a rivet-like head which permanently secures the coil form to the circuit board.

Referring now to the drawing, a printed circuit board is indicated at 10 and a coil form to be mounted thereon is indicated generally at 11. The coil form carries a coil 12 of fine wire with the ends of the coil being indicated at 13. Generally heat is applied to the cleat-like elements 14 of the coil form to fuse them and effectively secure the coil ends 13 to the form.

Figure 2:
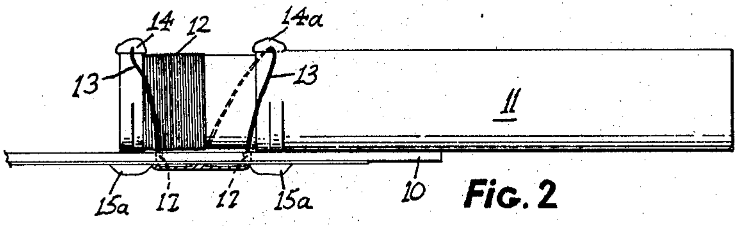
FIG. 2 is a view similar to FIG. 1 showing the situation after the board has passed through the solder bath.
Figure 3:
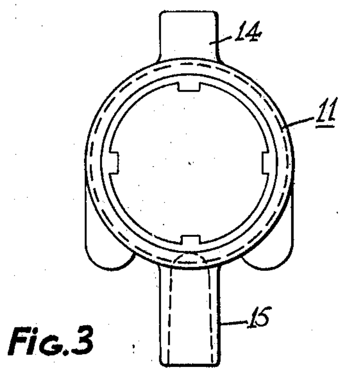
FIG. 3 is an end elevational view of the coil form of FIG. 1.

According to the present invention, the coil form is provided with one or more and preferably two mounting feet 15. In the embodiment of FIGS. 1 to 3, these feet are tubular so that they may be compressed in being pushed through holes in the mounting board 10. When they are thus pushed through holes as at 16, the coil form is frictionally held in place on the circuit board 10, all as shown in FIG. 1.

In FIG. 2 the cleat-like elements 14 are shown fused as at 14*a* and the coil ends 13 have been passed through holes 17 in the circuit board 10 and have been soldered to the printed circuit indicated at 18 and the ends of the feet 15 have been fused concurrently into rivet-like heads 15*a*.

Figure 4:
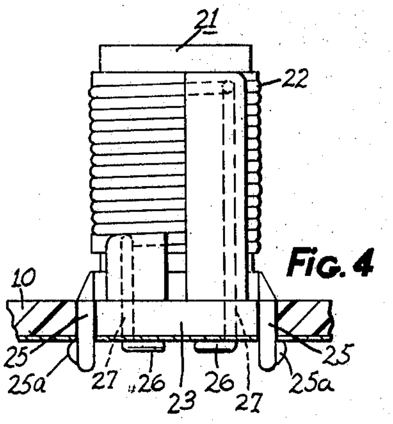
FIG. 4 is an elevational view with parts in section of a modified form of the invention.
Figure 5:
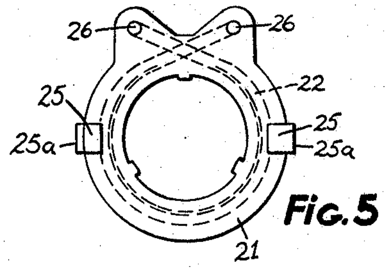
FIG. 5 is a bottom plan view of the coil form of FIG. 4.

In the embodiment of FIGS. 4 and 5, a coil form 21 is shown carrying a coil 22. Accordingly to this embodiment, the circuit board will have a large hole 23. In this embodiment the coil form is provided with mounting legs 25 which carry outwardly extending protuberances 25*a*. The coil form is temporarily secured to the circuit board by pressing the legs 25 through the hole 23 during which the legs 25 will be sprung inwardly toward each other and then snap back out with the protuberances 25*a* engaging over the printed circuit side of the board 10.

The coil ends 26 are passed through holes 27 and will be soldered as above described and at the same time the ends of the legs 25 and protuberances 25*a* will be fused to form a rivet-like head.

The embodiments of the invention in which an exclusive property or privilege is claimed are defined as follows:

1. The method of securing a thermoplastic, coil carrying component to a printed circuit board, said component having at least one pin-like extension of the material of said component of a length to pass through a hole in said board, said board having a hole to accommodate said pin-like extension, and having a hole for a lead from said coil; comprising the steps of temporarily securing said component to said board by engaging said pin-like extension in said hole, passing said lead through its respective hole, and subjecting said board to a solder bath, simultaneously connecting said lead to said circuit and concurrently fusing the end of said pin-like extension into a rivet-like head, to secure said component permanently to said board.

2. The method of claim 1, said pin-like extension being tubular and thus compressible, wherein the step of temporarily securing said component to said board is accomplished by pressing said pin-like extension through said hole, wherein it is held frictionally.

3. The method of claim 2, said component having two tubular pin-like extensions and said board having two holes, wherein the step of temporarily securing said component to said board is accomplished by pressing said two extensions respectively through said two holes, wherein they are compressed and held frictionally.

4. The method of claim 1, said pin-like extension having at its end an outwardly directed lip, wherein the step of temporarily securing said component to said board is accomplished by pushing said pin-like extension through said hole and engaging said lip beyond said board.

5. The method of claim 4, said component having two pin-like extensions each having at its end an outwardly directed lip, the hole in said board being of sufficient size to accommodate both said pin-like extensions, and the step of temporarily securing said component to said board is accomplished by passing said pin-like extensions through said hole while deflecting them toward each other, said extensions then springing back with said lips engaging the other side of said board.

References Cited

FOREIGN PATENTS 657,015 2/1963 Canada.

DARRELL L. CLAY, Primary Examiner

U.S. Cl. X.R.

317—101; 336—65, 192